(12) United States Patent
Zevenbergen et al.

(10) Patent No.: US 9,688,489 B1
(45) Date of Patent: Jun. 27, 2017

(54) MODULAR DOCK FOR FACILITIES INTEGRATION

(71) Applicant: X Development LLC, Mountain View, CA (US)

(72) Inventors: John Zevenbergen, San Francisco, CA (US); Stefan Nusser, Palo Alto, CA (US); Troy Straszheim, Palo Alto, CA (US)

(73) Assignee: X Development LLC, Mountain View, CA (US)

( * ) Notice: Subject to any disclaimer, the term of this patent is extended or adjusted under 35 U.S.C. 154(b) by 126 days.

(21) Appl. No.: 14/672,302

(22) Filed: Mar. 30, 2015

(51) Int. Cl.
*B65G 67/02* (2006.01)
*B65G 67/24* (2006.01)
(Continued)

(52) U.S. Cl.
CPC .............. *B65G 67/24* (2013.01); *B25J 11/00* (2013.01); *B25J 13/06* (2013.01); *B25J 19/02* (2013.01); *B25J 19/06* (2013.01); *B65G 67/02* (2013.01); *B65G 67/08* (2013.01); *B65G 67/20* (2013.01); *B65G 69/24* (2013.01); *Y10S 901/02* (2013.01)

(58) Field of Classification Search
CPC ........ B65G 67/02; B65G 67/04; B65G 67/08; B65G 67/20; B65G 67/24; B65G 69/24
See application file for complete search history.

(56) References Cited

U.S. PATENT DOCUMENTS 2,409,870 A * 10/1946 Kinnaird ................ B65G 67/20
414/373
4,940,379 A * 7/1990 Staege ................. B65G 69/006
414/401
(Continued)

FOREIGN PATENT DOCUMENTS

DE    102008036067 A1 *  2/2010  ............. B65G 67/20
DE    102011012325 A1 *  8/2012  ............. B65G 67/20
(Continued)

OTHER PUBLICATIONS

Web-page from Intelligrated "Case, tote polybag conveyor" accessed on Feb. 18, 2015 at https://ww.intelligrated.com/case-tote-polybag-conveyor.
(Continued)

*Primary Examiner* — James Keenan
(74) *Attorney, Agent, or Firm* — McDonnell Boehnen Hulbert & Berghoff LLP

(57) ABSTRACT

An example apparatus includes an enclosed rectangular container, including an openable first end and an openable second end. The apparatus further includes at least one first supporting base positioned proximate to the first end of the container that has an adjustable height in order to align a floor of the container with a trailer. The apparatus also includes at least one second supporting base positioned proximate to the second end of the container that has an adjustable height in order to align the floor of the container with a loading dock. The apparatus additionally includes a robotic manipulator connected to the floor of the container (Continued)

that is configured to move one or more objects between the trailer and the loading dock by moving the one or more objects through the container when the first end and the second end of the container are opened.

20 Claims, 10 Drawing Sheets

(51) Int. Cl.
*B65G 69/24* (2006.01)
*B65G 67/20* (2006.01)
*B25J 11/00* (2006.01)
*B25J 19/06* (2006.01)
*B25J 13/06* (2006.01)
*B25J 19/02* (2006.01)
*B65G 67/08* (2006.01)

(56) References Cited

U.S. PATENT DOCUMENTS

| | | | |
|---|---|---|---|
| 4,950,118 A | 8/1990 | Mueller et al. | |
| 5,015,145 A * | 5/1991 | Angell | B65G 61/00 |
| | | | 414/391 |
| 5,201,626 A * | 4/1993 | Hansen | B65G 67/08 |
| | | | 414/398 |
| 5,685,416 A * | 11/1997 | Bonnet | B65G 67/08 |
| | | | 414/398 |
| 5,697,753 A * | 12/1997 | Aurora | B65G 67/08 |
| | | | 414/398 |
| 5,794,416 A | 8/1998 | Rahman | |
| 6,688,451 B2 | 2/2004 | Derby et al. | |
| 6,786,509 B2 | 9/2004 | Lang et al. | |
| 7,273,172 B2 | 9/2007 | Olsen, III et al. | |
| 7,695,235 B1 | 4/2010 | Rallis | |
| 8,047,756 B2 | 11/2011 | Tuffs et al. | |
| 8,562,277 B2 | 10/2013 | Criswell | |
| 8,571,700 B2 | 10/2013 | Keller et al. | |
| 8,622,199 B2 | 1/2014 | Windfeld et al. | |
| 8,684,652 B2 | 4/2014 | Byrne et al. | |
| 8,702,366 B2 * | 4/2014 | Campbell | B65G 63/002 |
| | | | 410/92 |
| 8,948,907 B2 | 2/2015 | Ugarte Barrena et al. | |
| 9,457,970 B1 * | 10/2016 | Zevenbergen | B65G 67/02 |
| 2007/0201971 A1 * | 8/2007 | Meijer | B65G 67/20 |
| | | | 414/679 |
| 2012/0207572 A1 * | 8/2012 | Enenkel | B65G 67/08 |
| | | | 414/502 |
| 2012/0253507 A1 | 10/2012 | Eldershaw et al. | |
| 2014/0205403 A1 | 7/2014 | Criswell | |
| 2014/0341694 A1 * | 11/2014 | Girtman | B65G 67/24 |
| | | | 414/796.5 |

FOREIGN PATENT DOCUMENTS

| | | | | |
|---|---|---|---|---|
| DE | 102011005545 A1 * | 9/2012 | | B65G 67/08 |
| EP | 1775246 A1 * | 4/2007 | | B65G 69/24 |
| EP | 2716591 A1 * | 4/2014 | | B65G 67/20 |
| EP | 2746078 A1 | 6/2014 | | |

OTHER PUBLICATIONS

Web-page from Robot Palletizer LLC. "RPM-8001-11-O/U" accessed on Feb. 18, 2015 at http://www.robotpalletizer.com/rmp800OU-palletizer.html.

* cited by examiner

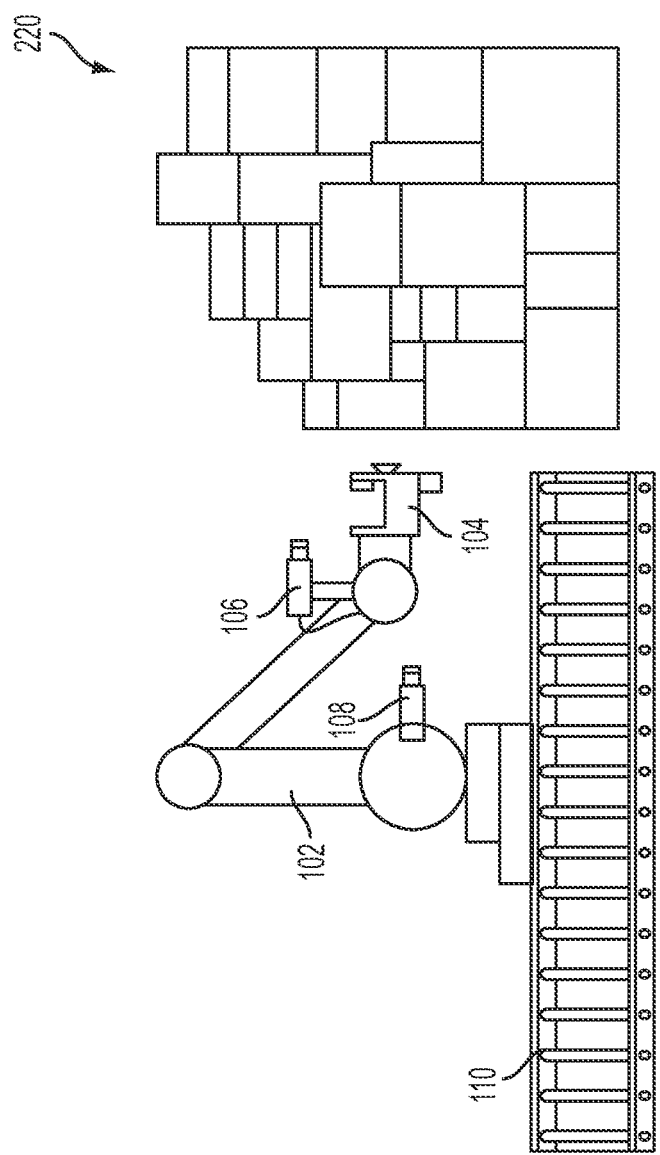

MODULAR DOCK FOR FACILITIES INTEGRATION

BACKGROUND

Robotic systems, such as a robotic arm containing a gripping component, may be used for applications involving picking up or moving objects. For instance, a robotic device may be used to fill a container with objects, create a stack of objects, or unload objects from a truck bed. In some cases, all of the objects may be of the same type. In other cases, a container or truck may contain a mix of different types of objects, such as boxed items, cans, tires, or other stackable objects. Such robotic systems may direct a robotic arm to pick up objects based on predetermined knowledge of where objects are in the environment.

SUMMARY

The present disclosure includes a rectangular container with a robotic manipulator inside to move objects between a loading dock located at one end of the container and a trailer located at the other end. The container may include one or more sets of wheels to allow it to be hauled as a trailer to a facility. After being positioned between a loading dock and another trailer, at least one front leg and at least one back leg of the container may be adjusted in height to align the floor of the container with the loading dock at the back end and with the trailer at the front end. The robotic manipulator inside the container may then be controlled to move one or more objects between the trailer and the loading dock. For instance, the robotic manipulator may unload boxes from the trailer onto a conveyor which extends from the container into the loading dock.

In one example, an apparatus is disclosed that includes an enclosed rectangular container, including an openable first end and an openable second end opposite the first end. The apparatus further includes at least one first supporting base positioned proximate to the first end of the container that has an adjustable height from the container to a ground surface in order to align a floor of the container with a trailer that is located at the first end of the container. The apparatus additionally includes at least one second supporting base positioned proximate to the second end of the container that has an adjustable height from the container to the ground surface in order to align the floor of the container with a loading dock that is located at the second end of the container. The apparatus also includes a robotic manipulator connected to the floor of the container, where the robotic manipulator is configured to move one or more objects between the trailer and the loading dock when the first end and the second end of the container are opened.

In a further example, a method is provided that includes adjusting, by at least one rear actuator, height to a ground surface of at least one rear supporting base of a rectangular container in order to align a floor of the rectangular container with a loading dock that is located at an open rear end of the rectangular container, where the at least one rear supporting base is positioned proximate to the open rear end of the rectangular container. The method further includes adjusting, by at least one front actuator, height to the ground surface of at least one front supporting base of the rectangular container in order to align the floor of the rectangular container with a trailer that is located at an open front end of the rectangular container, where the at least one front supporting base is positioned proximate to the open front end of the rectangular container. The method additionally includes moving, by a robotic manipulator connected to the floor of the rectangular container, one or more objects between the trailer and the loading dock by moving the one or more objects through the rectangular container.

In another example, a control system for a robotic manipulator is disclosed that is configured to cause an adjustment in height to a ground surface of at least one rear supporting base of a rectangular container in order to align a floor of the rectangular container with a loading dock that is located at an open rear end of the rectangular container, where the robotic manipulator is connected to the floor of the rectangular container. The control system is further configured to cause an adjustment in height to the ground surface of at least one front supporting base of the rectangular container in order to align the floor of the rectangular container with a trailer that is located at an open front end of the rectangular container. The control system is additionally configured to control the robotic manipulator to move one or more objects between the trailer and the loading dock by moving the one or more objects through the rectangular container.

In yet another example, a system may include means for adjusting height to a ground surface of at least one rear supporting base of a rectangular container in order to align a floor of the rectangular container with a loading dock that is located at an open rear end of the rectangular container, where the at least one rear supporting base is positioned proximate to the open rear end of the rectangular container. The system further includes means for adjusting height to the ground surface of at least one front supporting base of the rectangular container in order to align the floor of the rectangular container with a trailer that is located at an open front end of the rectangular container, where the at least one front supporting base is positioned proximate to the open front end of the rectangular container. The system additionally includes means for moving one or more objects between the trailer and the loading dock by moving the one or more objects through the rectangular container.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE DRAWINGS

FIG. 2A shows a robotic arm and a stack of boxes, according to an example embodiment.

DETAILED DESCRIPTION

Figure 1A:
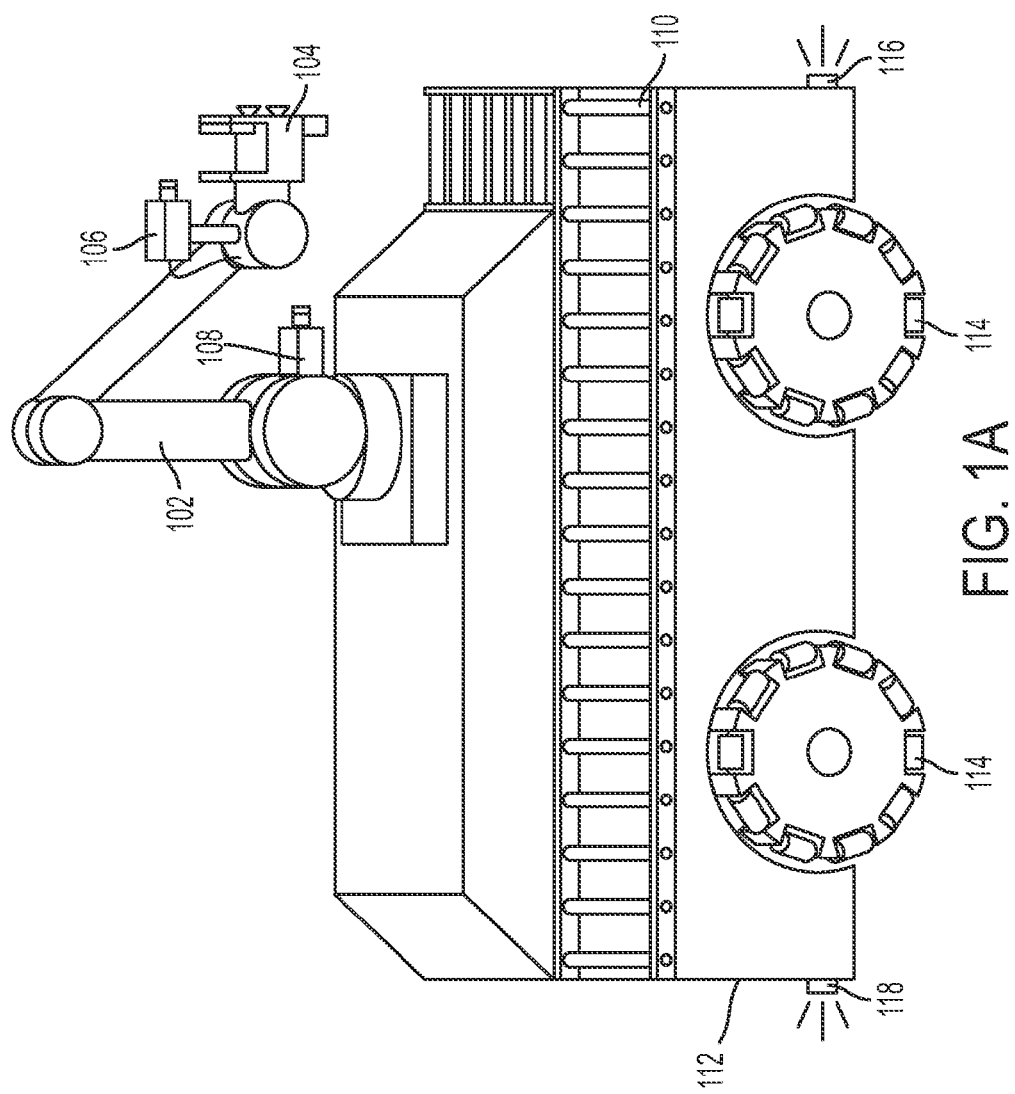
FIG. 1A shows a robotic arm mounted on a moveable cart, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

An example apparatus includes a modular, enclosed container with a robotic manipulator inside to move objects such as boxes between a trailer at one end and a loading dock at the other end. The apparatus (referred to as a "modular dock") may include one or more sets of wheels to allow it to be hauled by a truck to a facility, such as a warehouse. For operation, the modular dock may be positioned in between a loading dock at the facility and a truck trailer that is delivering boxes to and/or from the facility. As a specific example, the modular dock may be a relatively small and lightweight trailer (e.g., a 20-foot "half trailer") that can be backed up to the loading dock of a warehouse and quickly made operational. This form factor allows the modular dock to fit in the space between a typical warehouse dock and typical 53-foot truck trailers.

After backing up the modular dock to a loading dock, a back end of the modular dock may be opened (e.g., by sliding open a door) toward the loading dock. To facilitate robotic operation, the back end of the modular dock may be aligned with the loading dock using one or more load levelers (also referred to as "legs") positioned near the back end of the modular dock. For instance, the modular dock may contain a left back leg and a right back leg positioned at the back corners of the modular dock. Each back leg may be independently actuated to move up and down to align the floor of the modular dock with the loading dock on the back end.

A trailer to load and/or unload may then be connected to the front end of the modular dock, which also may be opened to allow the robotic arm of the modular dock to access the contents of the trailer. In order to align the front end of the modular dock with the trailer, the modular dock may also be equipped with one or more front legs positioned near the front end. Each front leg may be independently actuated to move up and down to align the floor of the modular dock with the trailer on the front end. Each time a new trailer hooks up to the modular dock, the legs may be adjusted to align with the new trailer.

Independently actuable legs (e.g., four legs that can be actuated to have four different heights from the ground to the container) allow the modular dock to adjust for uneven ground that may be encountered in a parking lot of a warehouse. Additionally, the adjustable legs may allow the modular dock to attach to many different types of buildings and/or trailers. In some examples, the load levelers may also be used to counteract robotic motion within the trailer as the robotic manipulator is moving objects such as incoming boxes (e.g., to prevent the modular dock from tipping).

To move boxes into a facility, a conveyor (e.g., a telescoping conveyor) may be extended from a loading dock through the modular dock. The boxes may then be moved by the robotic arm contained within the modular dock from the connected trailer onto the conveyor to transport them into the facility. In further examples, the modular dock may also be equipped with a piece of flexible conveyor which connects to the external conveyor from the loading dock. The flexible conveyor may be mounted to the floor of the modular dock to align with the loading dock and the attached trailer in order to take strain off the system as the robotic manipulator moves boxes onto to the flexible conveyor for delivery along the conveyor into the facility.

By placing the robotic arm inside a modular, enclosed truck trailer, the benefits of robotic manipulation (e.g., for moving boxes as well as other functions such as sorting boxes, palletizing boxes, and/or determining metrics of incoming boxes) may be obtained without using extra floor space or otherwise upsetting operation of the facility. Additionally, safety concerns related to robotic operation may be greatly simplified by containing the robotic arm within the enclosed confines of the modular dock.

The modular dock may also be equipped with one or more optical sensors fixed within the modular dock and/or attached to the robotic manipulator. A control system of the modular dock may use sensor data from these sensors to perform measurement, weighing, bar code scanning, and/or identification operations prior to moving boxes to or from existing facilities. The modular dock may also have its own network system in order to transmit this information about incoming or outgoing boxes to a facility. Other types of sensors may be used to determine box metrics within the modular dock as well.

In general, the modular dock presents an opportunity to standardize the environment of a robotic device and optimize the environment for robotic operation. In addition to a robotic manipulator and conveyance to and/or from the modular dock, the modular dock may also be equipped with a base operating system, a network communication system (e.g., a 4G uplink and a WiFi connection), and its own power system (e.g., a transformer and possibly its own generator). The modular dock may therefore be self-contained within a single unit with many different types of operations performed entirely within a transportable trailer (e.g., a "black box" for truck loading/unloading). By integrating functionality within the modular dock, the system may be pulled up and parked next to a facility dock and made operational in a matter of minutes. Additionally, to minimize deployment time, the combination of the robotic device and the modular dock may only need to be put through a safety audit one time. Afterwards, as long as certain guidelines are followed in operation of the system, individual deployments (e.g., the modular dock pulling up to a dock) may not require additional safety audits.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

According to various embodiments, described herein are methods and systems for automated loading and/or unloading of boxes and/or other objects, such as into a storage container or from a vehicle. In some example embodiments, boxes or objects may be automatically organized and placed onto pallets. Within examples, automating the process of loading/unloading trucks and/or the process of creating pallets from objects for easier storage and transport may provide a number of industrial and business advantages.

According to various embodiments, automating the process of loading/unloading trucks and/or the process of creating pallets may include the incorporation of one or more robotic devices to move objects or perform other functions. In some embodiments, a robotic device can be made mobile by coupling with a wheeled base, a holonomic base (e.g., a base that can move in any direction), or rails on the ceiling, walls or floors. In some embodiments, the base can be an elevated base.

In some examples, a system including one or more sensors, one or more computers, and one or more robotic arms is described. The sensors may scan an environment containing one or more objects in order to capture visual data and/or three-dimensional (3D) depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

As used herein, the term "boxes" will refer to any object or item that can be placed onto a pallet or loaded onto or unloaded from a truck or container. For example, in addition to rectangular solids, "boxes" can refer to cans, drums, tires or any other "simple" shaped geometric items. Additionally, "loading" and "unloading" can each be used to imply the other. For example, if an example describes a method for loading a truck, it is to be understood that substantially the same method can also be used for unloading the truck as well. As used herein, "palletizing" refers to loading boxes onto a pallet and stacking or arranging the boxes in a way such that the boxes on the pallet can be stored or transported on the pallet. In addition, the terms "palletizing" and "depalletizing" can each be used to imply the other.

Of course, examples herein may be applied toward objects other than boxes as well, and toward objects of various sizes and shapes.

According to various embodiments, a robotic manipulator may be mounted on a holonomic cart (e.g., a cart with wheels that allow the cart to move in any direction). FIG. 1A depicts an exemplary holonomic cart containing a robotic manipulator. In some embodiments, a moveable cart 112 may include a robotic arm 102 mounted on the cart 112. The robotic arm 102 may contain a gripping component 104 for gripping objects within the environment. The cart may contain one or more wheels 114, which may be holonomic wheels that operate with two degrees of freedom. In further embodiments, a wrap around front conveyor belt 110 may be included on the holonomic cart 112. In some examples, the wrap around front conveyor belt may allow the robot to not have to rotate its gripper to the left or right when unloading or loading boxes from or to a truck container or pallet.

In other examples, the robotic manipulator may be mounted on a different type of movable apparatus or may not be mounted on a movable base at all. For example, the robotic manipulator may be mounted at a fixed position within a factory setting. In other example embodiments, one or more robotic manipulators may be mounted on rails of a truck or container. In such examples, the robotic manipulators may be used to load or unload the truck or container.

Figure 1B:
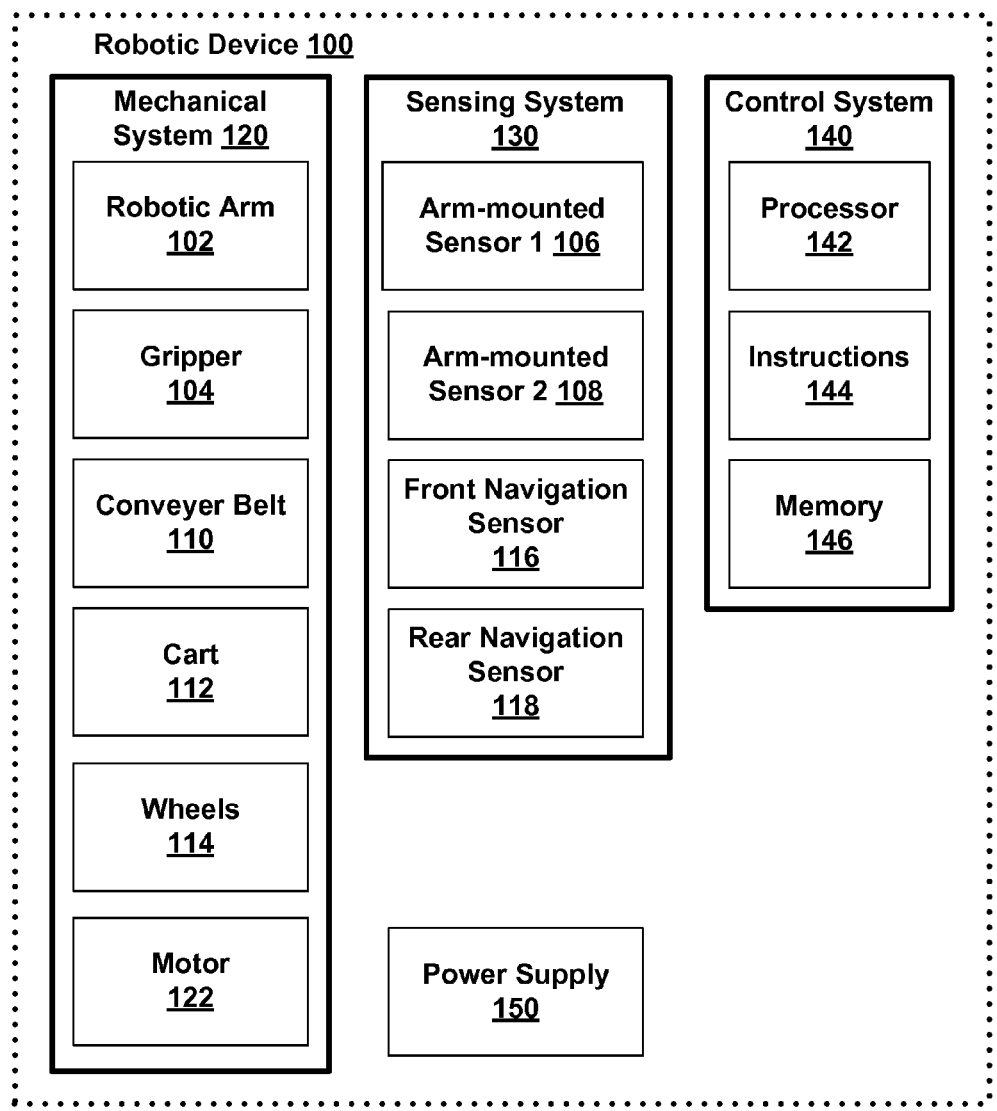
FIG. 1B is a functional block diagram illustrating a robotic device, according to an example embodiment.

FIG. 1B is a functional block diagram illustrating a robotic device 100, according to an example embodiment. The robotic device 100 could include various subsystems such as a mechanical system 120, a sensing system 130, a control system 140, as well as a power supply 150. The robotic device 100 may include more or fewer subsystems and each subsystem could include multiple elements. Further, each of the subsystems and elements of robotic device 100 could be interconnected. Thus, one or more of the described functions of the robotic device 100 may be divided up into additional functional or physical components, or combined into fewer functional or physical components. In some further examples, additional functional and/or physical components may be added to the examples illustrated by FIGS. 1A and 1B.

The mechanical system 120 may include components described above with respect to FIG. 1A, including a robotic arm 102, a gripper 104, a conveyor belt 110, a (movable or holonomic) cart 112, and one or more wheels 114. The mechanical system 120 may additionally include a motor 122, which may be an electric motor powered by electrical power, or may be powered by a number of different energy sources, such as a gas-based fuel or solar power. Additionally, motor 122 may be configured to receive power from power supply 150. The power supply 150 may provide power to various components of robotic device 100 and could represent, for example, a rechargeable lithium-ion or lead-acid battery. In an example embodiment, one or more banks of such batteries could be configured to provide electrical power. Other power supply materials and types are also possible.

The sensing system 130 may use one or more sensors attached to a robotic arm 102, such as sensor 106 and sensor 108, which may be 2D sensors and/or 3D depth sensors that sense information about the environment as the robotic arm 102 moves. The sensing system may determine information about the environment that can be used by control system 140 (e.g., a computer running motion planning software) to pick and move boxes efficiently. The control system 140 could be located on the device or could be in remote communication with the device. In further examples, scans from one or more 2D or 3D sensors with fixed mounts on a mobile base, such as a front navigation sensor 116 and a rear navigation sensor 118, and one or more sensors mounted on a robotic arm, such as sensor 106 and sensor 108, may be integrated to build up a digital model of the environment, including the sides, floor, ceiling, and/or front wall of a truck or other container. Using this information, the control system 140 may cause the mobile base to navigate into a position for unloading or loading.

In additional examples, planar surface information may be extracted from 3D sensors to model walls, floor and/or box faces. After modeling the floor, projection of objects onto the floor plane may enable segmentation of obstacles and/or target objects such as boxes. Floor-plane projection can also be used to model the corrugated sides of a container or truck, which may not be accurately modeled as planes. In further examples, sidewall angles, floor plane roll and pitch, and/or distance from side walls can be used to maneuver a mobile base into a container without collisions. Use of extended 3D information rather than a single line scan may help make the extraction of navigation information robust. For example, the side walls may have a vertical extent that is captured by the 3D sensor. Scanning systems that use a single line of depth information may be slower if they scan vertically and/or less robust because they acquire less information. In additional examples, front plane modeling can determine the distance to a next group of objects to pick in truck unloading.

In further examples, the robotic arm 102 may be equipped with a gripper 104, such as a digital suction grid gripper. In such embodiments, the gripper may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures.

In some embodiments, the gripper could potentially span several boxes or objects and turn on suction for some or all of the covered objects. In some embodiments, the suction or adhesion devices may be a "digital" grid so that the robotic device can turn on any number of the suction devices as will fit boxes sensed for grabbing. In some implementations, the system may notice a seam in the boxes (separation between adjacent boxes) such that suckers can be activated on both sides of the seam to pick up both boxes at once, thereby doubling the throughput. In some embodiments, the suckers can sense after a certain amount time whether they can successfully grip a surface, after which they may automatically shut off. In further embodiments, sections of the suckers can fold down to grasp the top of the boxes. For instance, grippers can initially start at full extension and then conform to the surface being gripped.

In further examples, the robotic arm can implement a wiggle movement to improve a suction grip. In additional embodiments, the robotic arm can wiggle a box side to side to help segment the box from its surroundings. In other embodiments, the arm can wiggle upon pick up of the box to avoid jostling other objects. In such embodiments, when trying to adhere to an object in order to pick it up using suction, the robotic arm may employ a wiggle motion in order to make a firm seal against the object. In further examples, the robotic arm may wiggle the object as the robotic arm is picking up the object so that the box can more gently break friction or overlap contact with other items. This may help avoid a situation where pulling the object up too directly or too quickly causes other items to be tossed into the air.

According to various embodiments, cardboard boxes can have concave, convex or otherwise rumpled faces that make it hard for a suction device to adhere to. Thus, wiggling the suction device as the device makes suction contact may enable a more reliable grip on cardboard boxes and other non-planar objects. In further examples, when first grabbing a box, a few center suction devices can be turned on and the arm can wiggle back and forth as it starts to pull the box out. This may break surface adhesion with other boxes and help to start to pull the box out. Once the box is at least partially pulled out, the box may then be segmented from the other boxes more easily. In some embodiments, wiggling while picking up an object in clutter may remove other objects from the picked up object, thereby preventing unwanted pick up of surrounding objects.

According to various embodiments, segmentation of items may be necessary for successful grasping. In some embodiments, a smooth surface patch may belong to two separate objects. In such instances, manipulator interaction with the objects may be used to perturb the scene to better segment the objects from each other. For motion separation, the natural or forced movement of objects on a conveyor, on a slide, moving in a tote, and/or actively jostled within a tote may be tracked by optical flow, parallax, or time delayed views to calculate stereo depth in order to enhance object segmentation.

In other examples, one or more of the sensors used by a sensing system may be a RGBaD (RGB+active Depth) color or monochrome camera registered to a depth sensing device that uses active vision techniques such as projecting a pattern into a scene to enable depth triangulation between the camera or cameras and the known offset pattern projector. This type of sensor data may help enable robust segmentation. According to various embodiments, cues such as barcodes, texture coherence, color, 3D surface properties, or printed text on the surface may also be used to identify an object and/or find its pose in order to know where and/or how to place the object (e.g., fitting the object into a fixture receptacle). In some embodiments, shadow or texture differences may be employed to segment objects as well.

Many or all of the functions of robotic device 100 could be controlled by control system 140. Control system 140 may include at least one processor 142 (which could include at least one microprocessor) that executes instructions 144 stored in a non-transitory computer readable medium, such as the memory 146. The control system 140 may also represent a plurality of computing devices that may serve to control individual components or subsystems of the robotic device 100 in a distributed fashion.

In some embodiments, memory 146 may contain instructions 144 (e.g., program logic) executable by the processor 142 to execute various functions of robotic device 100, including those described above in connection with FIGS. 1A-1B. Memory 146 may contain additional instructions as well, including instructions to transmit data to, receive data from, interact with, and/or control one or more of the mechanical system 120, the sensor system 130, and/or the control system 140.

According to various embodiments, a perception-guided robot is described. For instance, a robotic device may utilize a combination of perception together with planning to guide the robot arm to pick up a box and place it where it needs to go. FIG. 2A illustrates part of the robotic device from FIG. 1A with a stack of boxes, according to an example embodiment. As shown, the robotic device may include a robotic arm 102 with a gripping component 104, sensors 106 and 108, and conveyor 110 as described above. In some examples, the robotic device could be mounted on a holonomic cart as described with respect to FIG. 1A, could be mounted on a different type of movable apparatus, could be mounted on rails or tracks, or could be stationary. The robotic device may be controlled to pick boxes from a stack of boxes 220 containing a heterogenous mix of shapes and sizes of boxes.

Figure 2B:
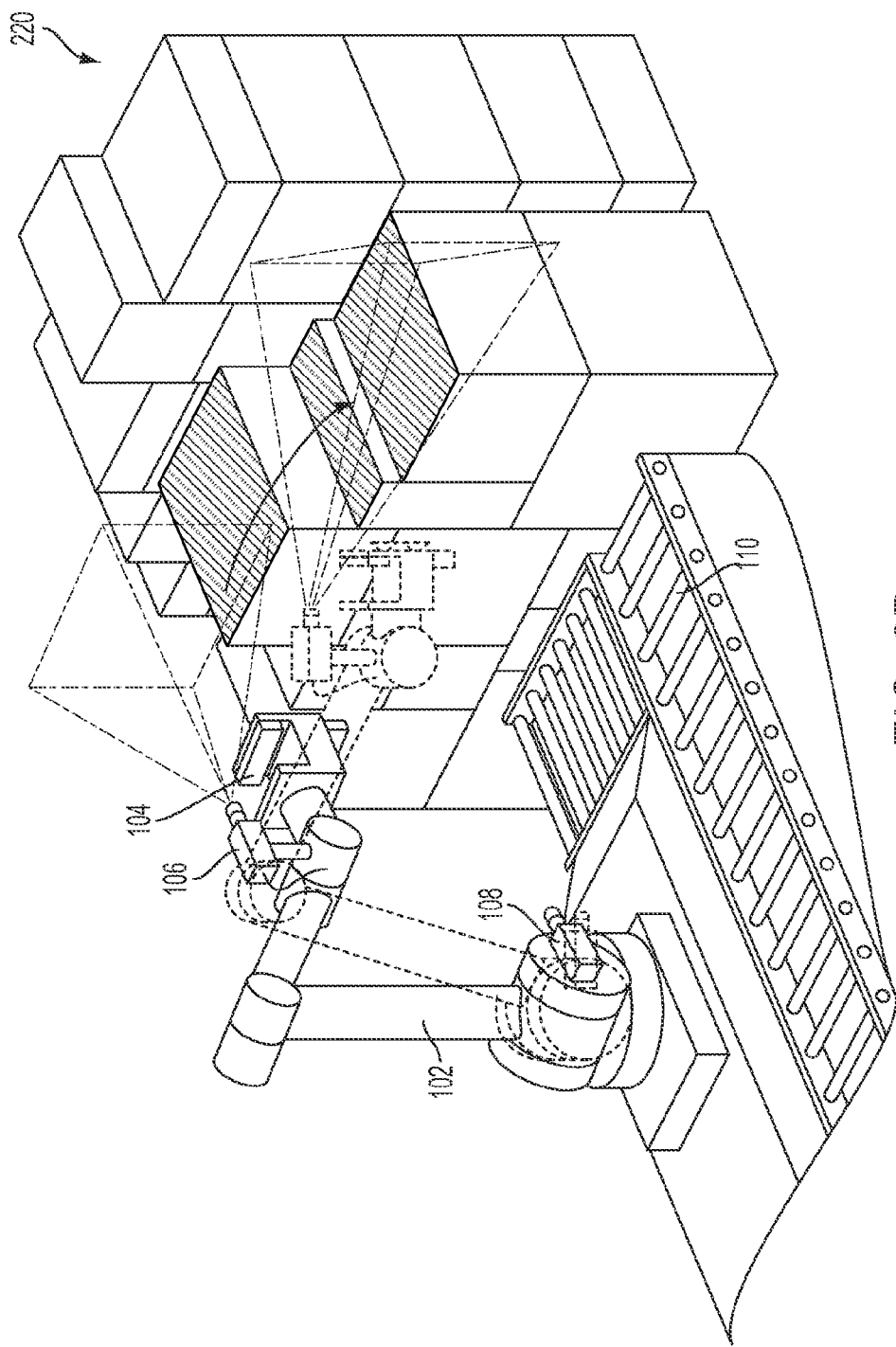
FIG. 2B shows scanning of the stack of boxes from FIG. 2A by a sensor mounted on the robotic arm, according to an example embodiment.

Within examples, a virtual environment including a model of the objects in 2D and/or 3D may be determined and used to develop a plan or strategy for picking up the boxes. In some examples, the robot may use one or more sensors to scan an environment containing objects, as shown in FIG. 2B. As the robotic arm 102 moves, a sensor 106 on the arm may capture sensor data about the stack of boxes 220 in order to determine shapes and/or positions of individual boxes. In additional examples, a larger picture of a 3D environment may be built up by integrating information from individual (e.g., 3D) scans. Sensors performing these scans may be placed in fixed positions, on a robotic arm, and/or in other locations. According to various embodiments, scans may be constructed and used in accordance with any or all of a number of different techniques.

In some examples, scans can be made by moving a robotic arm upon which one or more 3D sensors are mounted. Feedback from the arm position may provide pose information about where the sensor is positioned and may be used to help with the integration. Alternately, or additionally, scans may be made using one or more 2D sensors, for instance by leveraging motion and tracking keypoints in the environment. In further examples, scans may be from fixed-mount cameras that have fields of view (FOVs) covering a given field. In additional examples, scans may be visually registered to help with fine pose estimation, potentially giving better integration results.

In further examples, a virtual environment may be built up using a 3D volumetric or surface model to integrate information (e.g., from different sensors). This may allow the system to operate within a larger environment, such as in cases where one sensor may be insufficient to cover a large environment. Such techniques may also increase the level of detail captured, which may help the robotic device perform various tasks. In particular, integrating information can yield finer detail than from a single scan alone (e.g., by bringing down noise levels). This may make possible better object detection, surface picking, or other applications.

In further examples, wide-angle environment reconstruction may be performed by sensing an environment and extracting that information into a simplified geometric model of simple mathematical 3D geometric forms (e.g., planes, cylinders, cones, hemispheres, etc). In some instances, such techniques may make motion planning easier and/or may make violation of the models (e.g., collisions) easier to detect. Alternately, or additionally, such techniques may allow a parametric description to extend the environment. For instance, the ground may be treated as a plane that extends behind objects that occlude it.

In additional examples, planes or other mathematical surfaces in the environment may be extracted in 3D. These known "ideal" surface detections may be combined into a more accurate model of the environment. For instance, planes may be used to determine the full extents of walls (or mathematical description thereof) and other obstacles to avoid collisions and detect where objects of interest are. Also, mathematical representations of objects may be used to look for anomalies such as when person enters into an environment. Such events may violate the ideal model, which may make their detection easier.

In other examples, certain objects such as boxes may have simple planar form. For instance, a metal can may have a geometric form of a cylinder and a tire may have a geometric form of a torus. Example systems may leverage this trait of certain objects in order model them and/or determine how to motion plan for the objects. For instance, known templates of certain shapes can be used to refine detected features of objects within the environment that appear to match a particular shape.

In some examples, 2D and 3D information may be represented at least in part via one or more facades. A facade may be defined as a near-planar construct containing a set of objects, represented as a depth map (e.g., a 2D map of distances as the third dimension). Examples of facades may include the wall of boxes in a truck, the top of a pallet stack containing boxes or other objects, or the top of a bin of jumbled objects.

Figure 2C:
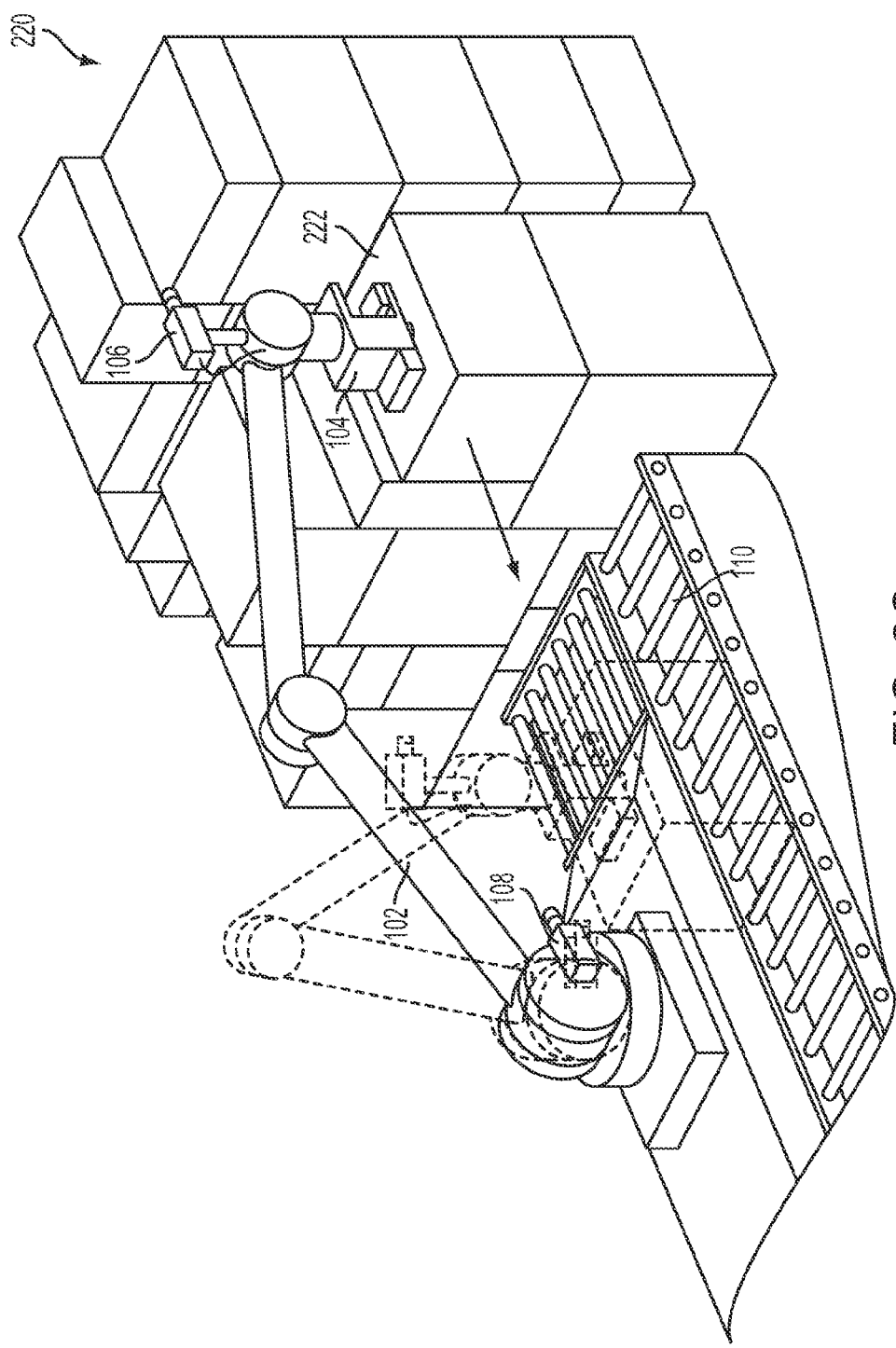
FIG. 2C shows the robotic arm from FIG. 2A moving a box, according to an example embodiment.

In further examples, a facade may be constructed from boxes, for instance to plan in what order the boxes should be picked up. For instance, as shown in FIG. 2C, box 222 may be identified by the robotic device as the next box to pick up. Box 222 may be identified within a facade representing a front wall of the stack of boxes 220 constructed based on sensor data collected by one or more sensors, such as sensor 106 and 108. A control system may then determine that box 222 is the next box to pick, possibly based on its shape and size, its position on top of the stack of boxes 220, and/or based on characteristics of a target container or location for the boxes. The robotic arm 102 may then be controlled to pick up the box 222 using gripper 104 and place the box 222 onto the conveyor belt 110 (e.g., to transport box 222 into a storage area).

In additional examples, a facade may be represented as an orthographic projection of 3D surface information. This representation may allow for parsing the facade to determine interesting areas for a particular application. For example, in truck unloading, the upper left corner of the next box to pick may be determined based on a facade representation. In other examples, an orthographic projection of integrated 3D environment may be determined to give a wide-FOV, easily-parsed representation for performing application-related tasks. One such task may be finding the corner or corners (e.g., top left) of a box to pick. Another such task may involve finding good surfaces (e.g., relatively flat and large) for picking objects out of a bin.

In further examples, a 3D model of a stack of boxes may be constructed and used as a model to help plan and track progress for loading/unloading boxes to/from a stack or pallet. Any one actual camera view of the facade may suffer from point of view occlusions and perspective distortion. Accordingly, multiple RGBD views via robot arm movements and/or different views from a cart base or fixed locations may be combine to create a single facade of the boxes to be picked.

In other examples, the 3D model may be used for collision avoidance. Within examples, planning a collision-free trajectory may involve determining the 3D location of objects and surfaces in the environment. A trajectory optimizer may make use of the 3D information provided by environment reconstruction to optimize paths in the presence of obstacles. In further examples, the optimizer may work in real time and may accept many kinds of constraints. As an example of such a constraint, the optimizer may attempt to keep the end effector level throughout the trajectory.

In additional examples, an environment may be captured as a mesh or set of 3D points. A robot arm may be represented as a convex hull of plane segments for quick collision checking. Constant or frequent updating of the environment may allow the robot arm to quickly respond to changes. In further examples, an optimizer may perform frequent continuous collision checking throughout its path. An optimizer may accept arbitrary constraints in the form of costs, such as to keep a certain distance away from objects or to approach a goal position from a given angle. Additionally, an optimizer may avoid robot fault conditions by working in joint space, keeping track of windup and choosing goal positions from among multiple inverse kinematics solutions. One strategy for motion planning may involve looking ahead several moves to see if the chosen goal joint position will be acceptable for the next move.

In some embodiments, path constraints, such as collision avoidance for robotic arms, cameras, cables, and/or other components, may be put in a constraint based planning solver and solved for to yield a best path to move the arm for perception. Additionally, in some embodiments, the solver may determine a best path for picking up, moving, and placing an object.

According to various embodiments, 3D and/or visual sensors may be calibrated to determine their pose with respect to the workspace. In the case of fixed sensors, the calibration may determine their fixed pose in the workspace. In the case of a sensor on the arm, calibration may determine the offset pose of the sensor from the arm link to which it is attached.

Within examples, calibration techniques may allow for the calibration of an arbitrary number of sensors in the workspace. Calibration may involve determining some or all of a variety of parameters and coefficients. For example, calibration may solve for one or more intrinsic parameters such as focal length and image center. As another example, calibration may determine one or more distortion coefficients such as models of radial and tangential distortion. As yet another example, calibration may solve for one or more extrinsic parameters, where the object is in a scene relative to a pattern or other sensors that identified the same pattern in a scene.

In some examples, calibration may be performed at least in part by using a calibration pattern, which may be a known set of features in 2D or 3D. For instance, a known pattern of dots may be used, where the distance between each dot and the other dots is known. Calibration may be performed at least in part by collecting multiple different views of an object. In further examples, capturing multiple views of a calibration pattern in different positions may allow for (1) calibration of the one or more coefficients of the camera and/or (2) knowledge of where the camera is relative to the coordinate system established by where the calibration pattern was fixed. In particular embodiments, a camera in the scene may identify a calibration pattern on the robot arm while a camera on the arm identifies a calibration pattern in the scene simultaneously.

In additional examples, calibration may involve a camera fixed in a scene. In this case, a calibration pattern may be placed on a robotic arm. The robotic arm may be configured to move through the scene as multiple views of the calibration pattern on the robotic arm are collected. This may help to calibrate the camera and/or be useful for relating the coordinate system of the camera to that of the robot. Further, the relation of each device to the other can be determined by each device as the robotic arm moves.

In certain examples, calibration may involve a camera located on a robotic arm. A calibration pattern may be mounted on a wall or table. Then, the camera may be moved around, collecting multiple views of the calibration pattern from different robot or robotic arm positions. When different 3D or 2D views (e.g., 2, 20, 200) are collected, these views can be used to solve for the calibration relationships. After calibration, when the camera on the arm moves, the system can determine where it is relative to the coordinate system set based on the location of the calibration pattern in the scene. In particular embodiments, both the calibration pattern and the camera may be movable. For example, the calibration pattern may be located on a conveyor belt where the robotic arm may be configured to place boxes. After calibration, the system may determine where the camera was relative to that spot on the conveyor belt.

In further examples, nonlinear optimization may be performed in a two-stage process for robust estimation of 3D sensor calibration. In one stage, an initialization may be derived from the relative pose offsets of the target and the sensors. In another stage, given the initialization, a batch bundle adjustment may be used to find the optimal pose of the cameras together with the target points. Calibration can be extended to the estimation of robot parameters such as joint lengths and joint angle offsets.

In other examples, known, precise, robot motion of the camera over a calibration pattern, or a calibration pattern over a camera may be used to improve calibration results. For instance, information about precisely how the camera moves may be used to obtain more accurate camera calibration. That is, if the camera is moved 50 mm right, the corresponding (perspective projection) amount of movement from the calibration object may be detected. This information may be used to jointly or separately optimize the calibration and tracking parameters.

In additional examples, a robot can look at its ongoing calibration and move in such a way as to maximize information for better calibration. For example, it can detect that some view areas have not been seen and go to those views.

In further examples, a system for the practical manipulation of heterogeneous, categorical items, generally from a cluttered collection area to a defined bin, is presented. In some embodiments, the pick location containing the items may not be sensitive to precise object orientation(s) and items may be mixed together. In additional examples, the place location for the items may or may not be sensitive to object orientation. In some examples, the pick-and-place regions may be defined as 3D regions acceptable for picking or placing an object, with some tolerance. The pick-and-place region may be highly cluttered with similar and/or disparate objects. In other embodiments, the items may come from or be put into a fixture, such as metal or plastic snaps that hold the sorted item in a particular orientation.

In additional examples, environment modeling of both the pick-and-place location may be used for intelligent grasp location and motion, as well as event reporting (e.g., when a place region is full or a pick region is empty). In some examples, object bounding volumes may be computed and/or distinguishing features of objects may be found (such as textures, colors, barcodes or OCR). In some embodiments, objects may be sorted into an assigned destination location by matching against a database of location assignments indexed by object type or object ID. For instance, an object's locations may be derived from reading a barcode, considering the size of the object, and/or by recognizing a particular kind of object.

In some examples, a plan for a robotic device may be determined in order to achieve certain configurations of the objects within a target location for the objects. For instance, the goals for loading/unloading or constructing/deconstructing pallets may be to achieve: 1) a dense packing with minimal air gaps in between boxes, and/or 2) a stable packing that won't easily collapse. In some embodiments, stability may require that, in general, heavy objects are on the bottom, and light objects are on top. In other examples, pallets may be created in order to avoid non-interlaced column stacks, column leans, or other characteristics of a bad stack.

In further examples, the pallet or truck/container may be loaded such that work by human operators in subsequent unloading processes is minimized. For instance, in some embodiments, items may be placed in last in, first out order such that, upon unpacking, the items needed first are on top, the items needed second are one layer down and so on. In other examples, the loading of pallets may be independent of how items flow towards the packing cells. Thus, according to some embodiments, the system can handle packages sent in random order or in an order known in advance. In addition, in some embodiments, systems may adapt to changes in the flow of items on the fly. In further examples, one or more boxes may be recorded and buffered by holding the boxes in a temporary storage area where their order can be changed along the way.

According to various embodiments, a 2D simulator and/or a 3D simulator may be utilized for truck or container loading/unloading or for pallet loading/unloading. In some examples, the state of a stack of boxes may be captured in the physical world and input into the simulator. In some embodiments, a variable size queue of boxes from one to all the boxes may be used by a simulator for finding a next box to pick. For example, a queue of 2 boxes or 4 boxes or 10 boxes may be considered by a simulator.

In further examples, the simulator may search over the boxes in the queue to find the best box placement by heuristic algorithms and/or by brute force or multi-resolution search. In some embodiments, the system may increment with increasingly fine placement of boxes around the best sites found in the previously coarser level. In some embodiments, once placement of particular next box has been determined, a physics planner may be used for motion planning in order to move the box efficiently to the determined locations. In further examples, the physical and simulated stacks may be continuously monitored for quality of the stack (e.g., density, stability, and/or order placement). In some examples, the process may be repeated until all the boxes have been placed or the target container can no longer fit in another box.

Figure 3A:
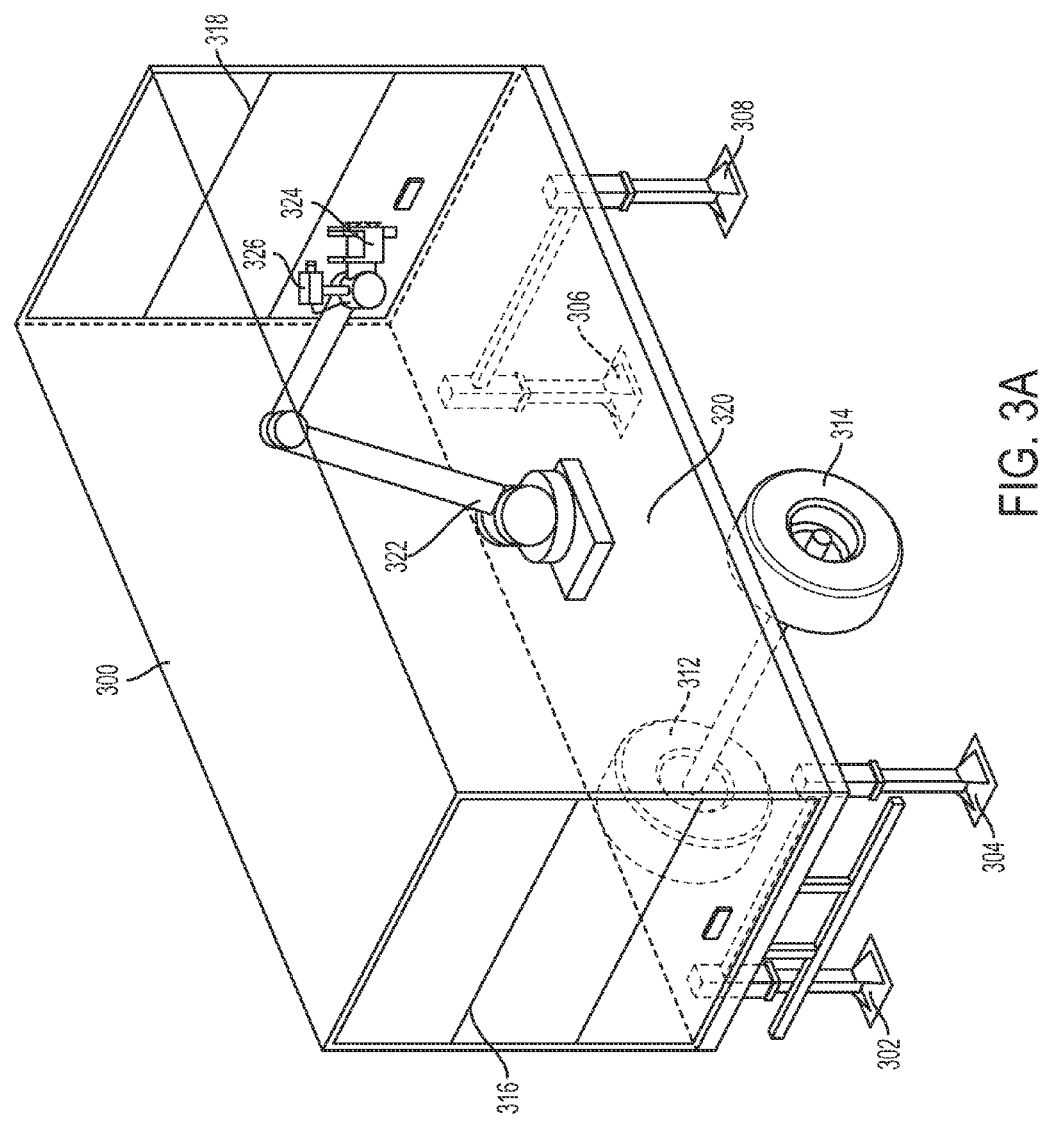
FIG. 3A illustrates a modular dock, according to an example embodiment.

FIG. 3A illustrates a modular dock, according to an example embodiment. More specifically, an enclosed rectangular container 300 may include a robotic manipulator 322 that is contained within the interior space of the container 300. For instance, the robotic manipulator 322 may connected to the floor 320 of the container 300 by fixing the base of the robot 322 to the floor 320. The robotic manipulator 322 may be configured to move objects to or from the container 300 when one or both of a first end (e.g., the front end) and a second end (e.g., the back end) are opened. For instance, the robot 322 may be used to unload objects from a trailer connected at the front end 318 and facilitate transport of the objects to a loading dock of a warehouse connected at the back end 316 of the container 300.

Within examples, the rectangular container 300 encloses a three-dimensional rectangular space that is large enough to enable movement of the robotic manipulator 322 within the container 300. One or more axles with corresponding left and right wheels 312, 314 may be attached to allow the modular dock to be hauled by a truck between facilities. In some examples, the modular dock may be a semi-trailer as shown in FIG. 3A with only a rear axle, and without a front axle. The container 300 may have a height and width comparable to standard semi-trailers (e.g., an overall height of 13.5 feet with rear door dimensions of 94 in. width×104 in. height). Additionally, the container 300 may have a length substantially shorter than full-sized 53-foot semi-trailers. For instance, the container 300 may have a length that is approximately half of a full-sized semi-trailer. In another example, the container 300 may have a length of approximately 20 feet. By using this form factor, the modular dock may be fit into tighter spaces within a parking lot of a facility, while still being long enough to haul with a truck. In other examples, the container 300 may have different dimensions. The modular dock may also be a full trailer with front wheels attached to a front axle and rear wheels attached to a rear axle as well.

The modular dock may additionally include one or more rear supporting bases, shown in FIG. 3A as rear left leg 302 and rear right leg 304 positioned proximate to the rear end of container 300. For instance, the rear legs 302, 304 may be positioned at the very end of the container 300, one foot away from the end, or three feet away from the end. Additionally, the rear left leg 302 may be positioned proximate to the left edge of the container 300 (e.g., at the left edge of the container 300, or a certain distance away from the left edge). Further, the rear right leg 302 may be positioned proximate to the right edge of the container 300 (e.g., at the right edge of the container 300, or a certain distance away from the right edge).

Each of the rear legs 302, 304 may be extendable from the bottom of the container 300 to the ground in order to adjust alignment of the rear end of the container 300. In particular, each of the rear left leg 302 and the rear right leg 304 may be extended or retracted in order to adjust the distance between the floor 320 of container 300 and the ground at the rear end of the container 300. The rear left leg 302 and the rear right leg 304 may be adjusted to different heights to change the tilt or angle of the floor 320 at the rear of the container 300 relative to the ground as well or instead.

The modular dock may also include one or more front supporting bases, shown in FIG. 3A as front left leg 306 and front right leg 308 positioned proximate to (e.g., at or near) the front end of container 300. Each of the front legs 306, 308 may be extendable from the bottom of the container 300 to the ground in order to adjust alignment of the front end of the container 300. In particular, each of the front left leg 306 and the front right leg 308 may be extended or retracted in order to adjust the distance between the floor 320 of container 300 and the ground at the front end of the container 300. The front left leg 306 and the front right leg 308 may be adjusted to different heights to change the tilt or angle of the floor 320 at the front of the container 300 relative to the ground as well or instead.

The floor 320 of the container 300 may be constructed to allow a certain amount of bend to allow for simultaneous adjustment of any combination of the four legs 302-308. In further examples, more or fewer legs may be used and/or one or more legs may be positioned at different locations on the container 300. For instance, in one example, a modular dock may contain two rear legs and a single front leg. The three legs may define a plane controlling how the floor of the modular dock is oriented. In such an example, all three of the legs may be adjusted to align the modular dock both on the back end and on the front end. Other arrangements of the legs are also possible.

Within examples, the load levelers 302-308 may take on various different shapes or forms. Referring to FIG. 3A, each leg may include an internal square-shaped piece that slides out from an external square-shaped holder for height adjustment. An actuator corresponding to each leg may be used to cause extension or retraction of the leg. For example, the modular dock may contain four separate hydraulic actuators that use hydraulic fluids to adjust heights of each of the four legs. In some examples, separate fittings may be used to attach each of the legs 302-308 to the bottom of the container 300. Other types of actuators and/or forms or shapes of load levelers may also be used.

The container 300 of the modular dock may be enclosed and the legs 302-308 may be retracted during transport of modular dock (e.g., hauling by a truck). Additionally, the front end and the rear end of the container 300 may be openable in order to allow objects to pass through the container 300 from the front to the back, or the back to the front. In one example, the rear end of the container 300 may be opened after backing the modular dock up to a loading dock, and then the heights of the back legs 302, 304 may be adjusted to align with the loading dock. Additionally, the front end of the container 300 may be opened after another trailer is connected to the front of the modular dock, and then the heights of the front legs 306, 308 may be adjusted to align with the trailer.

As shown in FIG. 3A, the rear end of the container 300 may include a roll door 316 which slides up to open the rear of the container 300 (e.g., to a loading dock). In other examples, a different type of door such as a swing door may be used instead. In further examples, the rear end of the container 300 may only be partially openable. For instance, a rear door may be configured to slide up only enough to allow boxes to pass underneath on a conveyor. Such a design may be used, for example, to ensure that the robotic manipulator 322 cannot move outside of the back end of the container 300 and interfere with operation on a loading dock.

The front end of the container 300 may also include a roll door 318 which slides up to open the front of the container 300 (e.g., to another trailer). The front door 318 and the rear door 316 may be of the same type or they may be of different types. The front door 318 may also be fully openable or only partially openable.

In some examples, the front end of the container 300 may also include a metal plate (e.g., positioned on the floor 320 of the container 300) that can be flipped into a connected trailer to transition into the connected trailer. Such a metal plate may be used to help level the container 300 with a connected trailer. The metal plate may also be used to help level a piece of conveyor (e.g., that is placed on top of the metal plate after it has been flipped into a connected trailer) as well.

Within examples, the robotic manipulator 322 of the modular dock is a mechanically operable device with at least one mechanical component for moving objects such as boxes. For example, the robotic manipulator 322 may be a robotic arm with an end-effector-mounted gripper 324. The robotic manipulator 322 may include any of the components or systems described in reference to the robotic truck unloader illustrated by FIGS. 1A-1B and 2A-2C. For instance, the robotic manipulator 322 may include at least one attached optical sensor 326 to assist with object identification during object movement.

One or more optical sensors may be fixed within the container 300 to detect objects or determine properties of objects moved to or from the container 300 as well. In further examples, the modular dock may include one or more optical sensors positioned near the front end of the modular dock in order to collect sensor data from a trailer connected to the front end of the modular dock. For instance, the modular dock may include a laser sensor that scans the gap between the top row of boxes and the ceiling of a trailer. In additional examples, the front end of the modular dock may contain cameras, light sources, and/or other types of sensing devices to identify objects within the trailer to move with the robotic manipulator, or otherwise to determine metrology of the objects as well.

The robotic manipulator 322 may be connected to the floor 320 of the container 300 to facilitate automated object manipulation after the floor 320 has been aligned with a loading dock at the back of the modular dock and a trailer at the front of the modular dock. For instance, the robotic manipulator 322 may be operating on substantially the same plane as the floor of a connected trailer with boxes to unload as well as one or more conveyors which run from the modular dock into the loading dock. The alignment process may therefore take strain off the system as the robot operates and/or may stabilize the modular dock to prevent rocking or tipping.

The robotic manipulator 322 may be connected to the floor 320 of the container 300 in various ways. For instance, as shown in FIG. 3A, a base of the robotic manipulator 322 may be affixed or attached to the floor 320. In other examples, a different component of the robotic manipulator 322 may be mounted to the floor instead. In further examples, the floor 320 of the container 300 may be constructed with the robotic manipulator 322 built in to a part of the floor 320. In other examples, the robotic manipulator 322 may be mounted to rails on the floor 320 which may allow for horizontal movement of the robotic manipulator 322 within the container 300. Different components may be used to move the robotic manipulator 322 along the floor 320 as well.

In further examples, a modular dock may contain a robotic manipulator positioned elsewhere within container 300. For instance, a robotic manipulator could be connected to a ceiling or to a side wall. In additional examples, a modular dock may also contain multiple robotic manipulators, possibly of different types and/or mounted at different positions within the container 300 as well.

The modular dock may also contain a control system to autonomously operate robotic manipulator 322. In some examples, the control system may be fixed within the container 300. The control system may also be removable so that it can be placed outside the modular dock and operated by a human operator via a user interface. The control system may be capable of performing any of the functions described previously in reference to FIGS. 1A-1B, and 2A-2C.

In further examples, the control system may additionally interface with one or more of the supporting bases 302-308. For instance, the control system may determine that the container 300 is tilting, bouncing, or otherwise moving beyond a certain threshold amount during robotic object manipulation. In response, the control system may cause an adjustment in height of at least one of the bases in an effort to stabilize the container 300.

In further examples, the control system may also determine one or more metrics of objects that are moved within the container 300, such as dimensions, weight, center of mass, value, and/or identifying information. This information may be determined using sensor data from one or more sensors coupled to the robotic manipulator 322 and/or contained within container 300. The modular dock may also contain a network communication system to allow the control system to transmit this information to a facility so that the facility knows information about incoming boxes before they arrive within the facility.

In additional examples, the control system may also use determined box metrics to adjust the height of one or more of the supporting bases 302-308. For example, the control system may identify a particularly heavy object, and may responsively adjust one or more of the bases to prevent the heavy object from causing an excessive amount of movement of the modular dock when the heavy object is moved by the robotic manipulator 322.

Figure 3B:
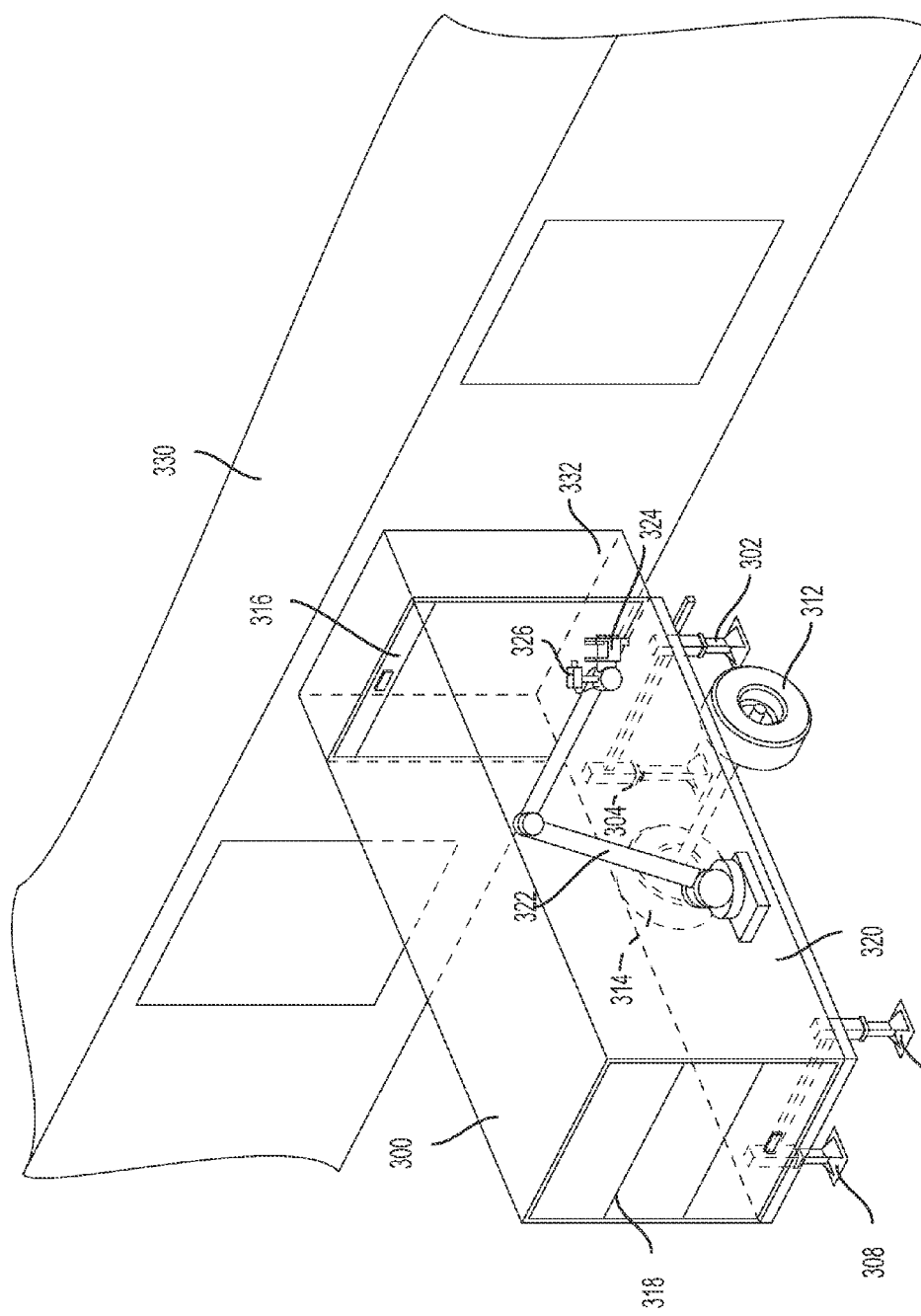
FIG. 3B illustrates a modular dock and a loading dock, according to an example embodiment.

FIG. 3B illustrates a modular dock connected to a loading dock of a facility, according to an example embodiment. More specifically, the modular dock is shown backed up to loading dock 332 of facility 330. Within examples, a loading dock or loading bay is an area of a building where objects are loaded to and/or unloaded from a truck. The loading dock may be exterior, flush with the building envelope, or fully enclosed within the building. The loading dock may include an overhead door or other means of opening into a facility. The facility could be a warehouse, a factory, or any other building where objects may be delivered.

After backing the modular dock up to the loading dock 332, the rear door 316 of the modular dock may be opened so that objects may pass between the container 300 and the loading dock 332. The rear load levelers 302, 304 may then be actuated to align the floor 320 at the rear of the container 300 with the loading dock 332. Each load leveler 302, 304 may be adjusted to a different height. For instance, as shown in FIG. 3B, right leg 304 may be adjusted to a greater height than left leg 302. This adjustment may allow the modular dock to adjust alignment for unevenness in the lot outside of facility 330. In some examples, the adjustment may be automated, such as by controlling actuation of the legs 302, 304 by a control system of the modular dock. In other examples, the adjustment may be done manually (e.g., by a human operator).

In additional examples, the modular dock may include at least one safety sensor integrated into the opening at the back end. The safety sensor may monitor an area at the opening to determine when a human enters the modular dock from the loading dock. If a human does enter, data from the safety sensor may be used to trigger a control signal to gracefully shut down the robotic manipulator, or otherwise ensure that the robotic manipulator does not contact the human. An example safety sensor may be an optical sensor, such as a laser sensor or a camera positioned to identify when a human crosses a plane aligned with the rear opening of the modular dock that is facing the loading dock.

In further examples, the modular dock may include an operator console integrated into the back end of the modular dock. The operator console may include a user interface to allow a user to control the robotic manipulator and/or other components of the modular dock, such as the load levelers. When the back end of the modular dock is opened, the operator console may swivel out towards the loading dock to a position where a human user can access the operator console from the loading dock. Accordingly, a human user may be given access to control the robot without having to enter the modular dock, which could create safety concerns or otherwise disrupt robotic operation.

Figure 3C:
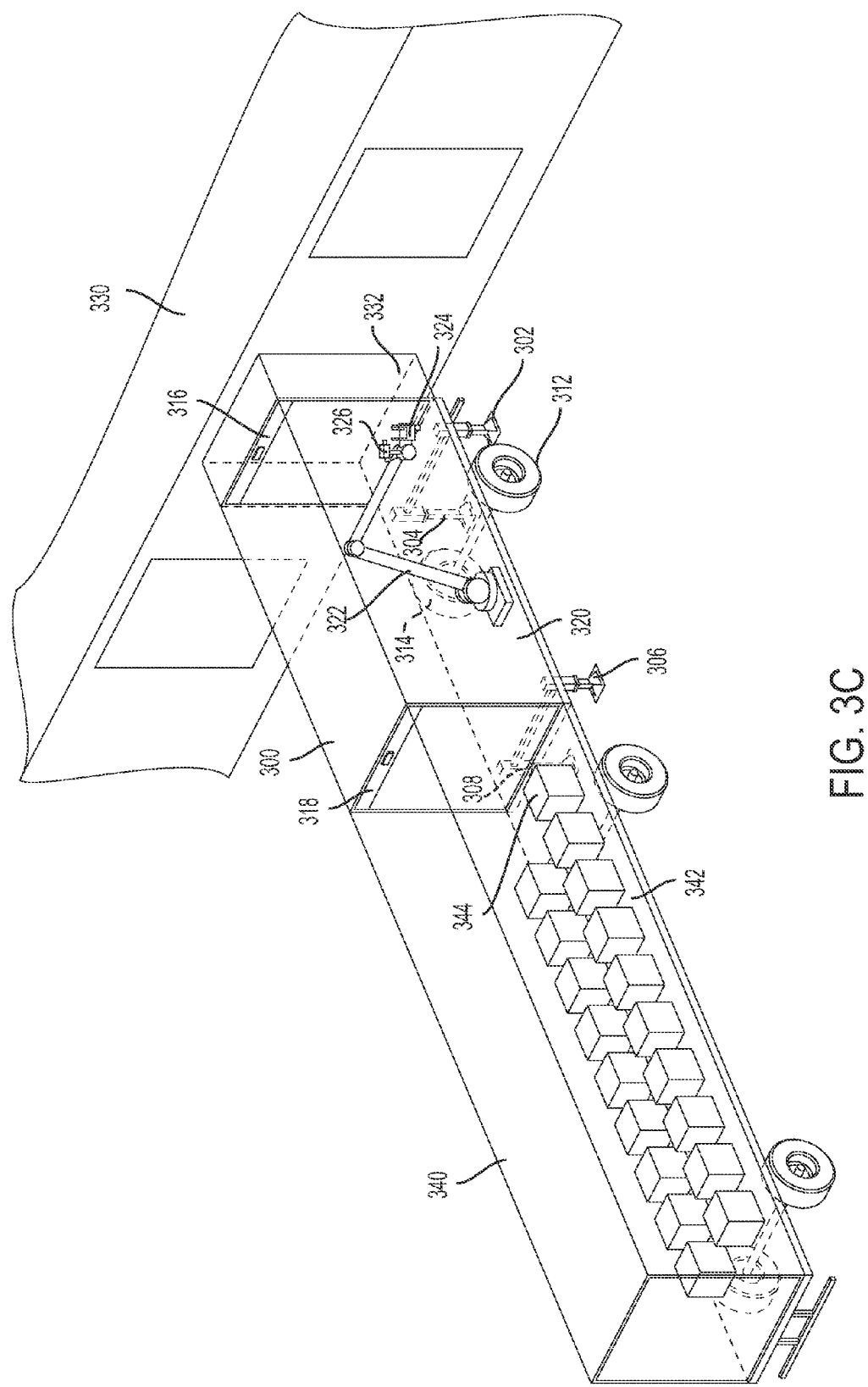
FIG. 3C illustrates a modular dock between a loading dock and a trailer, according to an example embodiment.

FIG. 3C illustrates a modular dock between a trailer and a loading dock, according to an example embodiment. After backing up the modular dock to loading dock 332, a trailer 340 may be positioned at the front end of the modular dock. Within examples, the trailer 340 is a wheeled unit designed to carry freight. The trailer 340 may have a number of different possible designs, shapes, and dimensions. In one example, the trailer 340 may be a standard 53-foot long semi-trailer or full-trailer that is operated to deliver boxes to and/or from facility 330.

In order to enable movement of boxes to and/or from trailer 340, the front door 318 of the container 300 may be partially or fully opened. Additionally, the front legs 306, 308 of the modular dock may be adjusted in height in order to align the floor 320 of the container 300 with a floor 342 of the trailer 340. Multiple front legs 306, 308 with independently adjustable heights may allow the modular dock to align with a number of different makes and models of trailers with sufficient precision to enable robotic manipulator 322 to move boxes to and/or from trailer 340. Additionally, separately actuable front legs 306, 308 may also allow the modular dock to adjust for unevenness in a lot outside facility 330. The front legs 306, 308 may be adjusted to align the modular dock with trailer 340 based on instructions from an automated control system within the modular dock and/or by manual operation of the corresponding actuators.

In a further example, each of the load levelers 302-308 of the modular dock may be adjusted in order to align the modular dock with both the facility 330 and the trailer 340. For instance, heights for each leg of the modular dock may be chosen in an effort to orient the floor 342 of the trailer 340, the floor 320 of the modular dock, and the loading dock 332 along roughly the same plane. By keeping each component aligned, control instructions for the robotic manipulator 322 may be determined without the need for additional transformations. Additionally, objects such as box 344 may be moved from the trailer 340 into the loading dock 332 while minimizing rocking, tipping, or other motion of the modular dock. Additionally, one or more conveyors may also be aligned along the same plane, or parallel to the same plane, to facilitate moving objects in conjunction with robotic manipulator 322. Example conveyors include one or more conveyors extending into facility 330, one or more conveyors fixed or otherwise contained within the modular dock, and/or one or more conveyors contained within trailer 340.

Figure 3D:
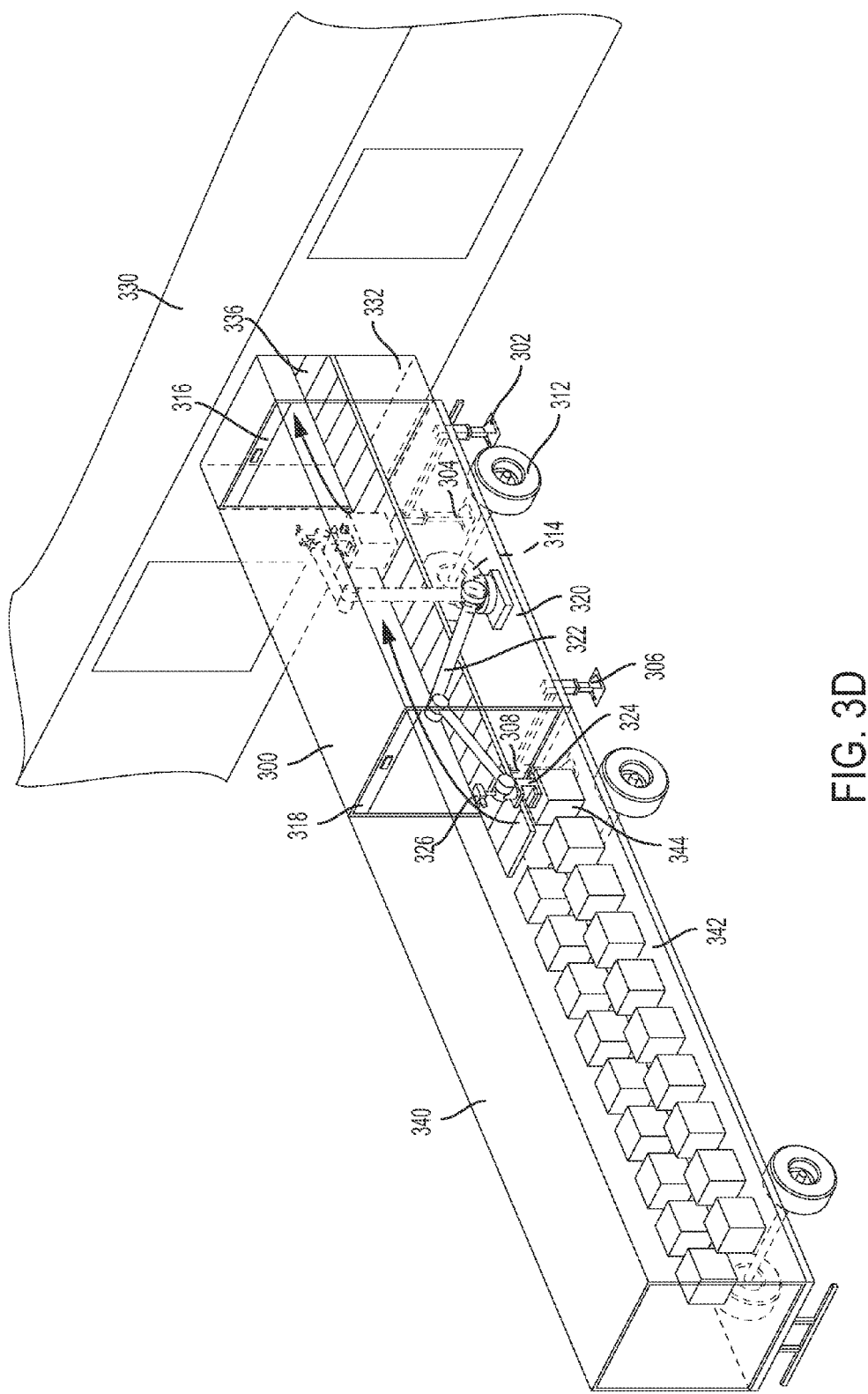
FIG. 3D illustrates movement of a box between the trailer and the loading dock from FIG. 3C, according to an example embodiment.

FIG. 3D illustrates movement of a box through the modular dock between the trailer and the loading dock from FIG. 3C, according to an example embodiment. In this example, a conveyor 336 is extended from the loading dock 330 through the modular dock and into the trailer 340. The conveyor 336 could be a telescoping conveyor or a different type of extendable conveyor. The robotic manipulator 322 may identify a box 344 to move from trailer 340, possibly by using sensor data received from optical sensor 326. The robotic manipulator 322 may then pick up the box 344 with gripper 324 and move the box 344 onto the conveyor 336 for transport into the facility 330. In FIG. 3D, the representation of the robotic manipulator 322 with solid lines represents a first position of the robotic manipulator and the representation with dashed lines represents a second position of the robotic manipulator. Additionally, the arrows represent the motion path of the box 344 as it is moved from the trailer 340 into the facility 330.

In this example, alignment of the modular dock with the trailer 340 may facilitate movement of the box 344 by the robotic manipulator 322 from the trailer 340 into the modular dock without putting excess strain on the system (e.g., making autonomous robotic operation more difficult, risking misplacement/dropping of the box, and/or risking tipping of the modular dock). Additionally, alignment of the modular dock with the loading dock 332 may also facilitate placement of the box 344 onto the conveyor 336 by the robotic manipulator 322 and transport of the box 344 into the facility 330 along conveyor 336.

In further examples, the conveyor 336 from the loading dock 332 may be connected to a piece of flexible conveyor contained within the container 300. It may be difficult to control placement or alignment of the conveyor 336, which may be attached to the facility 330. Accordingly, the robotic manipulator 322 may instead move boxes onto the flexible conveyor which may transport the boxes onto conveyor 336. The flexible conveyor may be mounted to the floor 320 of the container 300 or otherwise aligned with the floor 320 to facilitate robotic operation. The flexible conveyor may also be extendible into trailer 340 and/or into the loading dock 332 as well. In further examples, multiple pieces of flexible conveyor may be used, possibly extending in different directions within and/or from the modular dock. In other examples, conveyors may not be used at all. For instance, the robotic manipulator 322 may move objects directly from trailer 340 onto the loading dock 332.

After a connected trailer is fully loaded or unloaded, it may be hauled away, and a second trailer may be positioned in front of the modular dock. The front legs 306, 308 of the modular dock may be adjusted to adapt to the second trailer before moving boxes to and/or from the second trailer with robotic manipulator 322. In some examples, a control system of the modular dock may automatically detect that a new trailer has been placed in front of the modular dock (e.g., using sensor data from one or more optical sensors). The control system may then automatically cause the actuators to adjust the respective heights of the front legs 306, 308 to align with the new trailer and begin loading/unloading.

Figure 4:
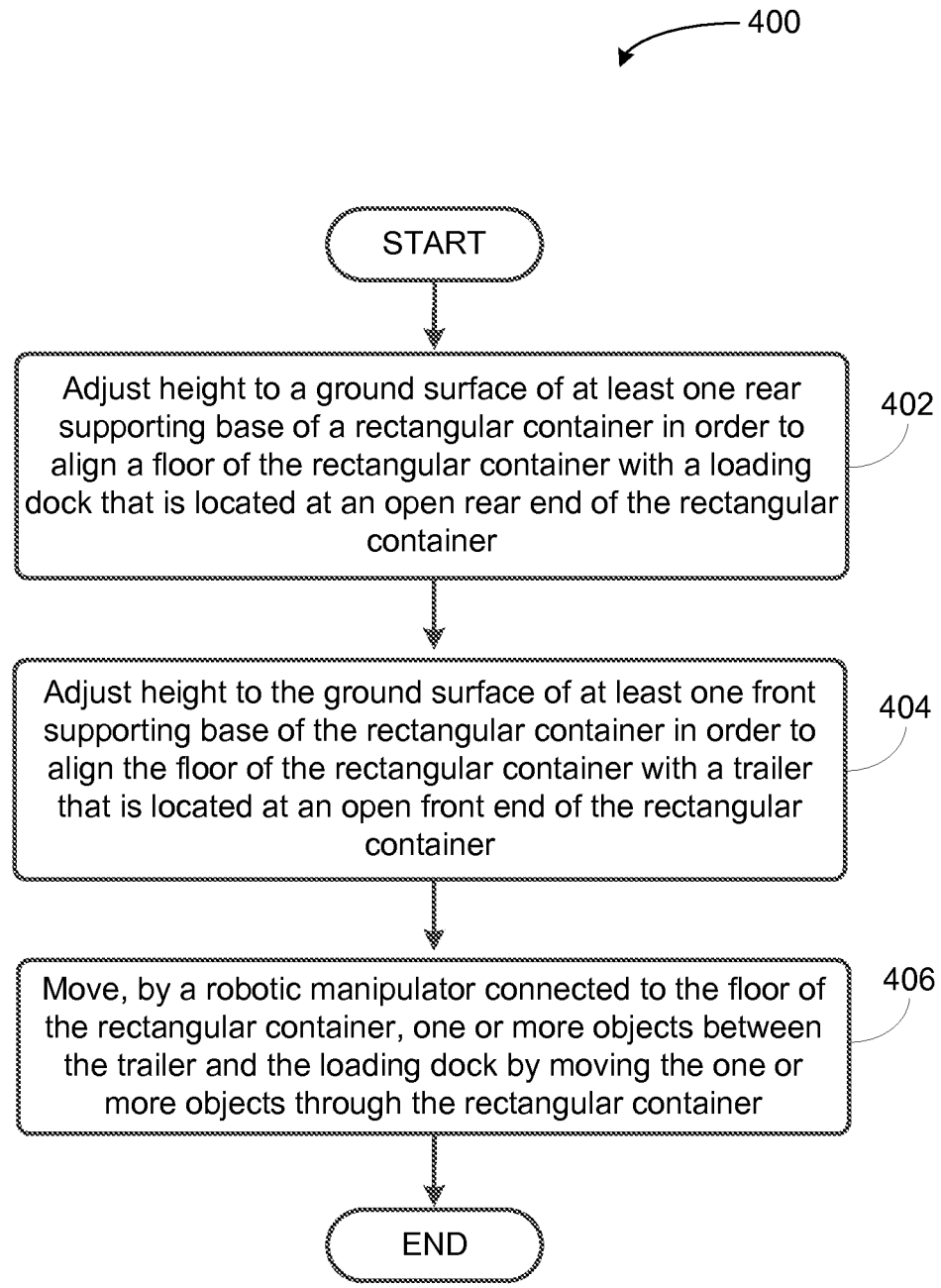
FIG. 4 is a block diagram of a method, according to an example embodiment.

FIG. 4 is a flowchart showing a method 400 that may allow for operation of a modular dock, according to an example embodiment. Method 400 may be carried out by any of the variations of modular docks and modular dock components described herein, such as the system illustrated and described with respect to FIGS. 3A-3D. In further examples, part or all of method 400 may be performed by one or more control systems located within a modular dock, within a robotic manipulator, and/or in remote communication with other system components. Additionally, various alternative embodiments may include other types of trailers, robotic manipulators, and/or other system components than those specifically illustrated in FIGS. 3A-3D.

As shown by block 402 of FIG. 4, method 400 may initially involve adjusting height to a ground surface of at least one rear supporting base of a rectangular container in order to align a floor of the rectangular container with a loading dock that is located at an open rear end of the rectangular container. The height adjustment may be actuated by one or more rear actuators that correspond to each of the rear supporting bases. The actuators may operate using hydraulic fluid pressure, or a different source of energy, such as electric current or pneumatic pressure. Each actuator may be controlled by a control system located inside or outside of the container. In other examples, the rear end of the container may be opened after the floor of the container has been aligned with the loading dock using the one or more rear supporting bases.

As shown by block 404 of FIG. 4, method 400 may further involve adjusting height to the ground surface of at least one front supporting base of the rectangular container in order to align the floor of the rectangular container with a trailer that is located at an open front end of the rectangular container. The height adjustment may be actuated by one or more front actuators that correspond to each of the front supporting bases. In some examples, the front bases may be adjusted at a point in time after the rear bases have been adjusted to align with the loading dock. In other examples, the front bases may be adjusted at a point time before the rear bases have been adjusted. In further examples, the front bases and rear bases may be adjusted simultaneously. In yet further examples, height adjustments of the front bases and rear bases may be interspersed during a single alignment process to align the floor of the container with both the loading dock at the back and the trailer at the front.

As shown by block 406 of FIG. 4, method 400 may further involve moving one or more objects between the trailer and the loading dock by moving the objects through the rectangular container with a robotic manipulator connected to the floor of the container. In some examples, the robotic manipulator may move the objects directly between the trailer and the loading dock (e.g., by reaching into the trailer, picking up an object, and carrying it through the modular dock to the loading dock). In other examples, the robotic manipulator may move objects through the container between the trailer and the loading dock by placing them onto and/or picking them up from one or more conveyors that are contained within the modular dock, run from the modular dock to the loading dock, and/or run from the modular dock to the trailer.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information, such as a block of a method described above, may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. An apparatus, comprising:
   an enclosed rectangular container, comprising an openable first end and an openable second end opposite the first end;
   at least one first supporting base positioned proximate to the first end of the container that has an adjustable height from the container;
   at least one second supporting base positioned proximate to the second end of the container that has an adjustable height from the container;
   a robotic manipulator connected to a floor of the container; and
   a control system configured to:
   adjust the adjustable height of the at least one first supporting base to align the floor of the container with a trailer when the trailer is located at the first end of the container;
   adjust the adjustable height of the at least one second supporting base to align the floor of the container with a loading dock when the loading dock is located at the second end of the container;
   provide instructions to cause the robotic manipulator to move an object between the trailer and the loading dock by moving the object through the container; and
   adjust the adjustable height of a supporting base of the at least one first supporting base and the at least one second supporting base to stabilize the container in response to movement of the object by the robotic manipulator.

2. The apparatus of claim 1, further comprising at least one pair of opposing wheels positioned proximate to the second end of the container to allow the container to be hauled by a truck when the at least one first supporting base and the at least one second supporting base are retracted.

3. The apparatus of claim 1, wherein the at least one first supporting base comprises a front right leg positioned proximate to a right side of the container and a front left leg positioned proximate to a left side of the container, wherein the front right leg and the front left leg have independently adjustable respective heights in order to align the floor of the container with the trailer.

4. The apparatus of claim 3, wherein the at least one second supporting base comprises a rear right leg positioned proximate to the right side of the container and a rear left leg positioned proximate to the left side of the container, wherein the rear right leg and the rear left leg have independently adjustable respective heights in order to align the floor of the container with the loading dock.

5. The apparatus of claim 1, wherein the robotic manipulator is configured to move the object from the container to a conveyor which extends from the container to the loading dock.

6. The apparatus of claim 5, further comprising a flexible conveyor contained within the container that is connected to the conveyor which extends from the container to the loading dock, wherein the robotic manipulator is configured to move the object from the trailer to the flexible conveyor to cause the object to be moved from the flexible conveyor to the conveyor which extends from the container to the loading dock.

7. The apparatus of claim 6, wherein the flexible conveyor is mounted to the floor of the container in order to align the flexible conveyor with the trailer and with the loading dock.

8. The apparatus of claim 1, wherein the control system is configured to:
   receive sensor data from one or more optical sensors within the container, wherein the sensor data is indicative of the object; and
   identify one or more metrics of the object based on the received sensor data before the object is moved out of the container.

9. The apparatus of claim 8, wherein the control system is further configured to:
   based on the one or more identified metrics of the object, determine at least one height adjustment of at least one supporting base of the at least one first supporting base and the at least one second supporting base in order to stabilize the container; and
   cause the at least one determined height adjustment of the at least one supporting base during movement of the object by the robotic manipulator.

10. The apparatus of claim 1, further comprising:
    at least one safety sensor positioned at the second end of the container that is configured to monitor a plane aligned with the open second end of the container; and
    wherein the control system is configured to:
    receive sensor data from the at least one safety sensor indicative of a user crossing the monitored plane; and
    responsively provide instructions to stop movement of the robotic manipulator.

11. The apparatus of claim 1, wherein the robotic manipulator comprises a robotic arm having a base, wherein the robotic manipulator is connected to the floor of the container by fixing the base of the robotic arm to the floor of the container.

12. The apparatus of claim 1, wherein the at least one first supporting base and the at least one second supporting base comprise four separately actuable supporting bases positioned proximate to four corners of the container, and wherein the control system is configured to adjust one of the supporting bases positioned proximate to a corner of the container to stabilize the container in response to movement of the object by the robotic manipulator.

13. The apparatus of claim 1, wherein the control system is further configured to:
    determine that the container is tilting beyond a threshold amount during robotic object manipulation; and
    in response to determining that the container is tilting beyond the threshold amount during robotic object manipulation, adjust the adjustable height of at least one supporting base to stabilize the container.

14. A method, comprising:
    adjusting, by at least one rear actuator, an adjustable height of at least one rear supporting base of a rectangular container in order to align a floor of the rectangular container with a loading dock that is located at an open rear end of the rectangular container, wherein the at least one rear supporting base is positioned proximate to the open rear end of the rectangular container;
    adjusting, by at least one front actuator, an adjustable height of at least one front supporting base of the rectangular container in order to align the floor of the rectangular container with a trailer that is located at an open front end of the rectangular container, wherein the at least one front supporting base is positioned proximate to the open front end of the rectangular container;

moving, by a robotic manipulator connected to the floor of the rectangular container, an object between the trailer and the loading dock by moving the object through the rectangular container; and adjusting the adjustable height of a supporting base of the at least one front supporting base and the at least one rear supporting base to stabilize the rectangular container in response to movement of the object by the robotic manipulator.

15. The method of claim 14, wherein the at least one front supporting base comprises a front right leg positioned proximate to a right side of the rectangular container and a front left leg positioned proximate to a left side of the rectangular container, the method further comprising:

adjusting the front right leg to a first height and the front left leg to a second height in order to align the floor of the rectangular container with the trailer.

16. The method of claim 15, wherein the at least one rear supporting base comprises a back right leg positioned at a right side of the rectangular container and a back left leg positioned at a left side of the rectangular container, the method further comprising:

adjusting the back left leg to a third height and the back right leg to a fourth height in order to align the floor of the rectangular container with the loading dock.

17. A control system for a robotic manipulator configured to:

adjust an adjustable height of at least one rear supporting base of a rectangular container in order to align a floor of the rectangular container with a loading dock when the loading dock is located at an open rear end of the rectangular container, wherein the robotic manipulator is connected to the floor of the rectangular container;

adjust an adjustable height of at least one front supporting base of the rectangular container in order to align the floor of the rectangular container with a trailer when the trailer is located at an open front end of the rectangular container;

control the robotic manipulator to move an object between the trailer and the loading dock by moving the object through the rectangular container; and adjust the adjustable height of a supporting base of the at least one front supporting base and the at least one rear supporting base to stabilize the rectangular container in response to movement of the object by the robotic manipulator.

18. The control system of claim 17, further configured to:

identify that a second trailer has been positioned at the open front end of the rectangular container;

cause a further adjustment in the adjustable height of the at least one front supporting base of the rectangular container in order to align the floor of the rectangular container with the second trailer; and control the robotic manipulator to move one or more additional objects between the second trailer and the loading dock.

19. The control system of claim 17, further configured to:

receive sensor data from one or more optical sensors coupled to the robotic manipulator, wherein the sensor data is indicative of the object; and identify one or more metrics of the objet based on the received sensor data before the object is moved out of the rectangular container.

20. The control system of claim 19, further configured to:

adjust the adjustable height of the supporting base to stabilize the rectangular container based on the one or more identified metrics of the object during movement of the the object by the robotic manipulator.

* * * * *